(12) United States Patent
Berkooz et al.

(10) Patent No.: US 11,858,496 B2
(45) Date of Patent: Jan. 2, 2024

(54) METHODS AND SYSTEMS FOR OPERATING A HYBRID VEHICLE

(71) Applicant: ZF Friedrichshafen AG, Friedrichshafen (DE)

(72) Inventors: Gahl Berkooz, Ann Arbor, MI (US); Greg Yezersky, Farmington Hills, MI (US); Lev Levine, Charlotte, NC (US); Iris Maria Weiss, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 5 days.

(21) Appl. No.: 17/483,073

(22) Filed: Sep. 23, 2021

(65) Prior Publication Data

US 2023/0087055 A1 Mar. 23, 2023

(51) Int. Cl.
*B60W 20/16* (2016.01)
*B60W 10/06* (2006.01)
*B60W 10/08* (2006.01)
*B60W 20/40* (2016.01)

(52) U.S. Cl.
CPC ............ *B60W 20/16* (2016.01); *B60W 10/06* (2013.01); *B60W 10/08* (2013.01); *B60W 20/40* (2013.01); *B60W 2540/215* (2020.02); *B60W 2540/30* (2013.01); *B60W 2556/10* (2020.02); *B60W 2756/10* (2020.02)

(58) Field of Classification Search
CPC ...... B60W 20/16; B60W 10/06; B60W 10/08; B60W 20/40; B60W 2540/215; B60W 2540/30; B60W 2556/10; B60W 2756/10
USPC .......................................................... 701/22
See application file for complete search history.

(56) References Cited

U.S. PATENT DOCUMENTS

| 9,469,289 B2 * | 10/2016 | Yu ......................... B60W 10/06 |
| 2011/0202210 A1 * | 8/2011 | Goda ...................... B60L 50/16 903/930 |
| 2020/0284599 A1 * | 9/2020 | Cyr .................... G01C 21/3469 |

* cited by examiner

*Primary Examiner* — Yi-Kai Wang
(74) *Attorney, Agent, or Firm* — Dority & Manning, P.A.

(57) ABSTRACT

A method for operating a hybrid vehicle includes obtaining propulsion switching data descriptive of a state of one or more vehicle systems for switching power flow of an internal combustion engine and an electric machine. The propulsion switching data may be used to provide a driver behavior recommendation and/or an actual environmental impact of the hybrid vehicle.

18 Claims, 4 Drawing Sheets

METHODS AND SYSTEMS FOR OPERATING A HYBRID VEHICLE

FIELD OF THE INVENTION

The present subject matter relates generally to systems and methods for operating a hybrid vehicle, and, more particularly to systems and methods for operating a hybrid vehicle to assess and/or reduce an environmental impact of the hybrid vehicle.

BACKGROUND OF THE INVENTION

Emission standards for vehicles are increasing in many countries. For instance, the United States of America has adopted laws and regulations, such as the Clean Air Act and the Corporate Average Fuel Economy program, that set requirements for carbon dioxide emissions for OEM fleets, specify the methodology for calculating vehicle emissions, and establish specific allowed carbon dioxide emission limits as well as penalties for non-compliance. State governments, such as California, have also adopted regulations that establish (e.g., often stricter) emission requirements.

Hybrid electrical vehicles often operate more efficiently and with less emissions that conventional internal combustion engine vehicles. Hybrid vehicle drivetrains generally include an internal combustion engine as well as electric machine for propelling the hybrid vehicle. Within the drivetrain, power flow is switched between the internal combustion engine and the electric machine. Using the electric machine, e.g., in lieu of or in addition to the internal combustion engine, the emissions of the hybrid vehicle can be reduced relative to propelling the vehicle with only the internal combustion engine.

Switching between the internal combustion engine and the electric machine can be based on operating parameters of the hybrid vehicles. Thus, a driver may influence whether the internal combustion engine and/or the electric machine propels the hybrid vehicle by the way in which the driver operates the vehicle. Moreover, certain hybrid vehicles allow a driver to select the internal combustion engine or the electric machine to propel the vehicle.

Accordingly, improved systems and methods for operating a hybrid vehicle, e.g., in order to assess and/or reduce an environmental impact of the hybrid vehicle, would be useful.

BRIEF DESCRIPTION OF THE INVENTION

Aspects and advantages of the invention will be set forth in part in the following description, or may be apparent from the description, or may be learned through practice of the invention.

The present subject matter relates generally to systems and methods for operating a hybrid vehicle, e.g., to assess and/or reduce an environmental impact of the hybrid vehicle. The systems and method of the present disclosure may include gathering data from vehicle systems relevant to switching propulsion of a vehicle between an internal combustion engine and an electric motor, comparing the gathered data to model data associated with switching from the internal combustion engine to the electric motor, and developing driver behavior suggestions based upon the differences between the gathered data and the model data, and delivering the driver behavior suggestions to a driver of the vehicle, e.g., in order to encourage environmentally conscious driving behavior. The systems and method of the present disclosure may also include collecting data regarding powertrain switching, storing the data, and analyzing the data in order to determine actual in-the-field emissions of the hybrid vehicle, e.g., for comparison with government mandated emission testing results. Other example aspects of the present disclosure are directed to systems, methods, vehicles, apparatuses, tangible, non-transitory computer-readable media, and memory devices for controlling hybrid vehicles.

In an example embodiment, a computer-implemented method for operating a hybrid vehicle includes obtaining, with a computing system of the hybrid vehicle that includes one or more computing devices, propulsion switching data descriptive of a state of one or more vehicle systems for switching power flow of an internal combustion engine and an electric machine. The method also includes comparing, with the computing system, the propulsion switching data to model propulsion switching data for the one or more vehicle systems. The method further includes determining, by the computing system, a driver behavior recommendation to initiate a switch in the power flow from the internal combustion engine to the electric machine and presenting the driver behavior recommendation on a driver interface.

In a first example aspect, obtaining the propulsion switching data may include obtaining the propulsion switching data with the computing system from the one or more vehicle systems via a CAN bus.

In a second example aspect, the model propulsion switching data may be stored within a memory of the computing system.

In a third example aspect, the model propulsion switching data may be stored within a remote server, and the method further includes wirelessly transmitting the model propulsion switching data from the remote server to the computing system.

In a fourth example aspect, the model propulsion switching data may be provided by a manufacturer of the hybrid vehicle.

In a fifth example aspect, determining the driver behavior recommendation may include determining, by the computing system, the driver behavior recommendation to reduce operation of the internal combustion engine.

In a sixth example aspect, the driver interface may include one or both of an infotainment monitor and a speaker within the hybrid vehicle.

In a seventh example aspect, the driver interface may include a software application on a driver computing device.

In an eighth example aspect, the propulsion switching data may include one or more of a battery charge state, a location of the hybrid vehicle, a destination of the hybrid vehicle, and an operating state of an air conditioning system.

In a ninth example aspect, the driver behavior recommendation may include one or more plugging in and charging a battery upon arrival at a destination, scheduling servicing of the battery, adjusting a speed of the hybrid vehicle, adjusting an operating state of an air conditioning system, and switching the power flow from the internal combustion engine to the electric machine.

Each of the example aspects recited above may be combined with one or more of the other example aspects recited above in certain embodiments. For instance, all of the nine example aspects recited above, i.e., the first through ninth examples aspects, may be combined with one another in some embodiments. As another example, any combination of two, three, four, five, or more of the nine example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

In another example embodiment, a method for operating a hybrid vehicle includes operating the hybrid vehicle on a roadway and obtaining propulsion switching data descriptive of a state of one or more vehicle systems for switching power flow of an internal combustion engine and an electric machine while the hybrid vehicle is operating on the roadway. The method also includes storing the propulsion switching data in a memory and processing the propulsion switching data in order to determine an actual environmental impact of the hybrid vehicle while the hybrid vehicle operated on the roadway.

In a tenth example aspect, obtaining the propulsion switching data may include obtaining the propulsion switching data over a regulatory operating interval. The regulatory operating interval may include a predetermined distance.

In an eleventh example aspect, obtaining the propulsion switching data may include obtaining the propulsion switching data with a computing system of the hybrid vehicle that includes one or more computing devices via a CAN bus.

In a twelfth example aspect, the propulsion switching data may be stored within a memory on the hybrid vehicle.

In a thirteenth example aspect, the propulsion switching data may be stored within a remote server, the method further may further include wirelessly transmitting the propulsion switching data from the hybrid vehicle to the remote server.

In a fourteenth example aspect, the propulsion switching data may include one or more of a start time of the hybrid vehicle operating on the roadway, a total operating time of the hybrid vehicle operating on the roadway, an interval of uninterrupted operation while the hybrid vehicle is operating on the roadway, and a switch time between the internal combustion engine and the electric machine.

Each of the example aspects recited above may be combined with one or more of the other example aspects recited above in certain embodiments. For instance, all of the five example aspects recited above, i.e., the tenth through the fourteenth example aspects, may be combined with one another in some embodiments. As another example, any combination of two, three, or more of the five example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
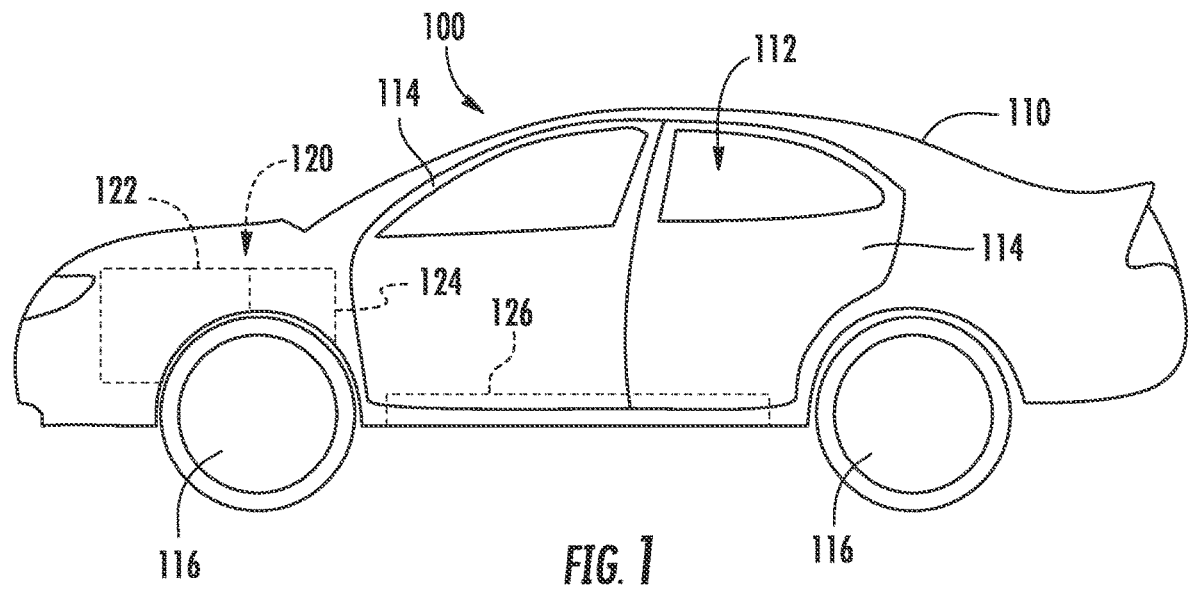
FIG. 1 is a side, elevation view of a passenger vehicle according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
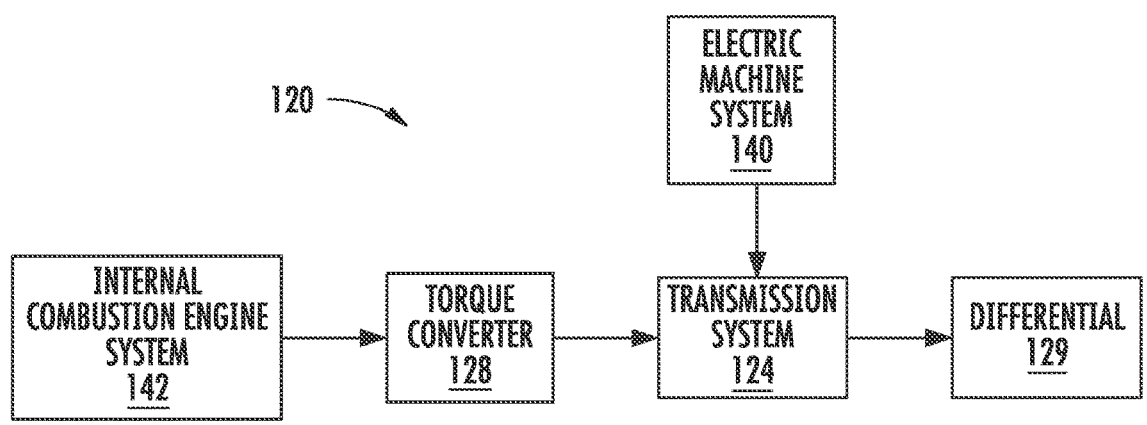
FIG. 2 is a schematic view of a drivetrain of the example vehicle of FIG. 1.

FIG. 1 is a side, elevation view of a passenger vehicle 100 according to an example embodiment. FIG. 2 is a schematic view of a drivetrain system 120 of passenger vehicle 100. As shown in FIG. 1, passenger vehicle 100 is illustrated as a sedan. However, passenger vehicle 100 in FIG. 1 is provided as an example only. For instance, passenger vehicle 100 may be a coupe, a convertible, a truck, a van, a sports utility vehicle, etc. in alternative example embodiments. In addition, while described below in the context of passenger vehicle 100, it will be understood that the present subject matter may be used in or with any other suitable vehicles, including commercial vehicles, such as tractor-trailers, busses, box trucks, farm vehicles, construction vehicles, etc., in other example embodiments.

Passenger vehicle 100 may include a body 110 rolls on wheels 116 during driving of passenger vehicle 100. Body 110 that defines an interior cabin 112, and a driver and passengers may access interior cabin 112 via doors 114 and sit within interior cabin 112 on seats (not shown). Within body 110, passenger vehicle 100 may also include various systems, including a motor system 122, a transmission system 124, an electrical accumulator/storage system 126, etc., for operating passenger vehicle 100.

In general, motor system 122, transmission system 124, and electrical accumulator system 126 may be configured in any conventional manner. For example, motor system 122 may include prime movers, such as an electric machine system 140 and an internal combustion engine system 142 (FIG. 2), that are operatable to propel passenger vehicle 100. Thus, passenger vehicle 100 may be referred to as a hybrid vehicle. Motor system 122 may be disposed within body 110 and may be coupled to transmission system 124. Transmission system 124 is disposed within power flow between motor system 122 and wheels 116 of passenger vehicle 100. In certain example embodiments, a torque converter 128 may be disposed in the power flow between internal combustion engine system 142 and transmission system 124 within drivetrain system 120. Transmission system 124 is operative to provide various speed and torque ratios between an input and output of the transmission system 124. Thus, e.g., transmission system 124 may provide a mechanical advantage to assist propulsion of passenger vehicle 100 by motor system 122. A differential 129 may be provided between transmission system 124 and wheels 116 to couple transmission system 124 and wheels 116 while also allowing relative rotation between wheels 116 on opposite sides of body 110.

Electric machine system 140 may be selectively operable as either a motor to propel passenger vehicle 100 or as a generator to provide electrical power, e.g., to electrical accumulator system 126 and other electrical consumers of passenger vehicle 100. Thus, e.g., electric machine system 140 may operate as a motor in certain operating modes of passenger vehicle 100, and electric machine system 140 may operate as generator in other operating modes of passenger vehicle 100. Electric machine system 140 may disposed within drivetrain system 120 in various arrangements. For instance, electric machine system 140 may be provided as a module in the power flow path between internal combustion engine system 142 and transmission system 124. As another example, electric machine system 140 may be integrated within transmission system 124.

Electrical accumulator system 126 may include one or more batteries, capacitors, etc. for storing electrical energy. Electric machine system 140 is coupled to electrical accumulator system 126 and may be selectively operable to charge electrical accumulator system 126 when operating as a generator and to draw electrical power from electrical accumulator system 126 to propel passenger vehicle 100 when operating as a motor.

A braking system (not shown) is operable to decelerate passenger vehicle 100. For instance, the braking system may include friction brakes configured to selectively reduce the rotational velocity of wheels 116. The braking system may also be configured to as a regenerative braking system that converts kinetic energy of wheels 116 into electric current. Operation of motor system 122, transmission system 124, electrical accumulator system 126, and the braking system are well known to those skilled in the art and not described in extensive detail herein for the sake of brevity.

Figure 3:
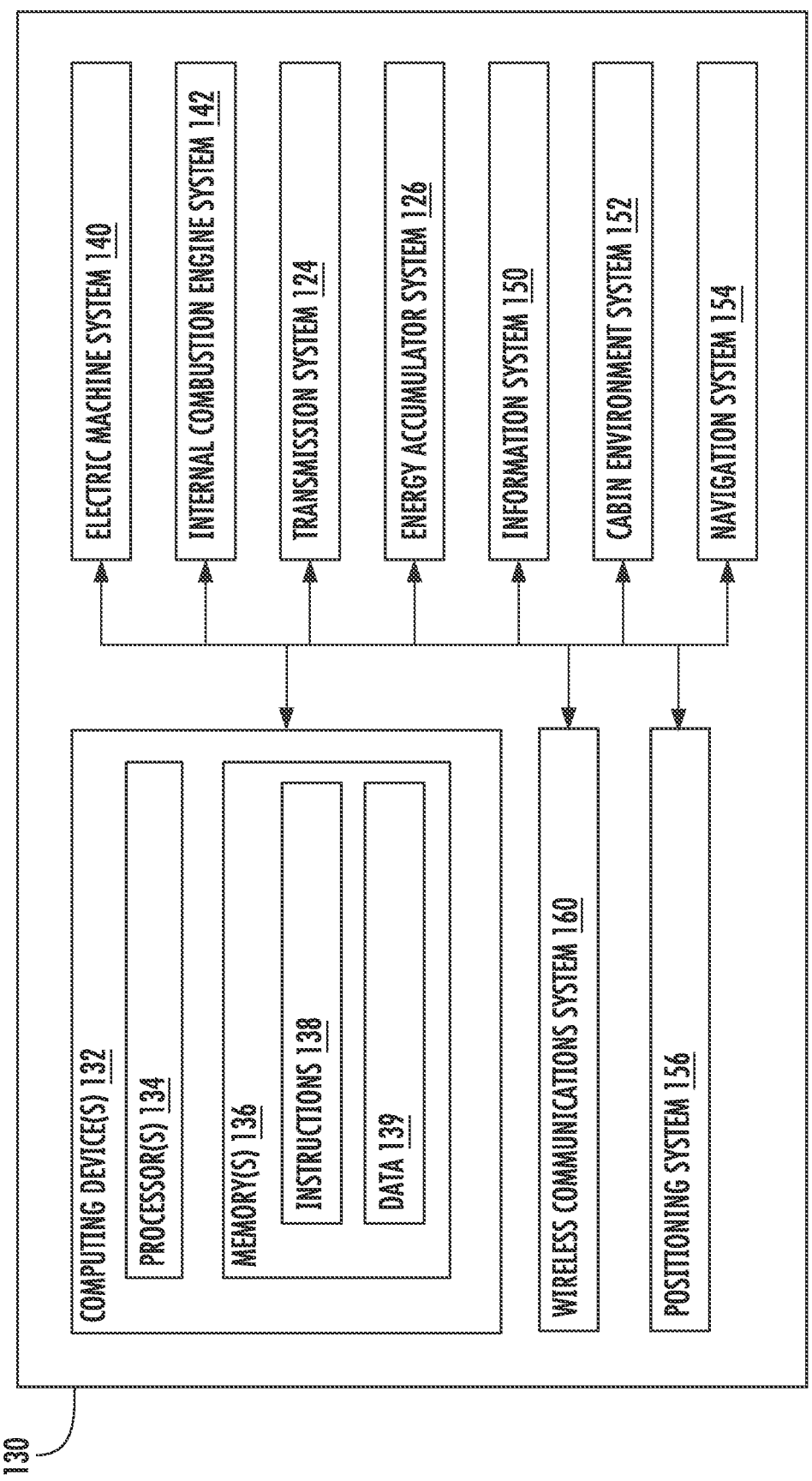
FIG. 3 is a schematic view of an example control system of the vehicle of FIG. 1 according to an example embodiment of the present subject matter.

FIG. 3 is a schematic view of certain components of a control system 130 suitable for use with passenger vehicle 100. In general, control system 130 is configured to control operation of passenger vehicle 100 and components therein. Control system 130 may facilitate operation of passenger vehicle 100 in various operating modes. For instance, control system 130 may be configured to operate passenger vehicle 100 in any one of a conventional mode, an electric mode, a hybrid mode, and a regeneration mode. In the conventional mode, passenger vehicle 100 is propelled only by internal combustion engine system 142. Conversely, passenger vehicle 100 is propelled only by electrical machine system 140 in the electric mode. The conventional mode may provide passenger vehicle 100 with an extended operating range relative to the electric mode, and passenger vehicle 100 may be quickly refilled at a fueling station to allow continued operation of passenger vehicle 100 in the conventional mode. Conversely, the emissions of passenger vehicle 100 may be significantly reduced in the electric mode relative to the conventional mode, and a fuel efficiency of passenger vehicle 100 may increase significantly in the electric mode as compared to the conventional mode. In the hybrid mode, passenger vehicle 100 may be propelled by both electrical machine system 140 and internal combustion engine system 142. In the regeneration mode, electrical machine system 140 may charge electrical accumulator system 126, e.g., and internal combustion engine system 142 may propel passenger vehicle 100. The various operating modes of passenger vehicle 100 are well known to those skilled in the art and not described in extensive detail herein for the sake of brevity.

As shown in FIG. 3, control system 130 includes one or more computing devices 132 with one or more processors 134 and one or more memory devices 136 (hereinafter referred to as "memories 136"). In certain example embodiments, control system 130 may correspond to an electronic control unit (ECU) of passenger vehicle 100. The one or more memories 136 stores information accessible by the one or more processors 134, including instructions 138 that may be executed and data 139 usable by the one or more processors 134. The one or more memories 136 may be of any type capable of storing information accessible by the one or more processors 134, including a computing device-readable medium. The memory is a non-transitory medium, such as a hard-drive, memory card, optical disk, solid-state, tape memory, or the like. The one or more memories 136 may include different combinations of the foregoing, whereby different portions of the instructions and data are stored on different types of media. The one or more processor 134 may be any conventional processors, such as commercially available CPUs. Alternatively, the one or more processors 134 may be a dedicated device, such as an ASIC or other hardware-based processor.

Instructions 138 may be any set of instructions to be executed directly (such as machine code) or indirectly (such as scripts) by the one or more processors 134. For example, the instructions 138 may be stored as computing device code on the computing device-readable medium of the one or more memories 136. In that regard, the terms "instructions" and "programs" may be used interchangeably herein. Instructions 138 may be stored in object code format for direct processing by the processor or in any other computing device language, including scripts or collections of independent source code modules that are interpreted on demand or compiled in advance. Data 139 may be retrieved, stored, or modified by the one or more processors 134 in accordance with the instructions 138. For instance, data 139 of the one or more memories 136 may store information from sensors of various systems of passenger vehicle 100, including motor system 122 (e.g., electrical machine system 140 and internal combustion engine system 142), transmission system 124, electrical accumulator system 126, etc. In FIG. 3, the processor(s) 134, memory(ies) 136, and other elements of computing device(s) 132 are shown within the same block. However, computing device(s) 132 may actually include multiple processors, computing devices, and/or memories that may or may not be stored within a common physical housing. Similarly, the one or more memories 136 may be a hard drive or other storage media located in a housing different from that of the processor(s) 134. Accordingly, computing device(s) 132 will be understood to include a collection of processor(s) and one or more memories that may or may not operate in parallel.

Computing device(s) 132 may be configured for communicating with various components of passenger vehicle 100. For example, computing device(s) 132 may be in operative communication with various systems of passenger vehicle 100, including motor system 122 (e.g., electrical machine system 140 and internal combustion engine system 142), transmission system 124, electrical accumulator system 126, etc. For instance, computing device(s) 132 may particularly be in operative communication with an engine control unit (ECU) (not shown) of motor system 122 and a transmission control unit (TCU) (not shown) of transmission system 124. Computing device(s) 132 may also be in operative communication with other systems of passenger vehicle 100, including a passenger/driver information system 150, e.g., that includes one or more display(s), speaker(s), gauge(s), etc. within interior cabin 112 for providing information regarding operation of passenger vehicle 100 to a passenger/driver, a cabin environment system 152 for modifying the temperature of interior cabin 112, e.g., via air conditioning, heating, etc., a navigation system 154 for navigating passenger vehicle 100 to a destination, and/or a positioning system 156 for determining a current location (e.g., GPS coordinates) of passenger vehicle 100. Computing device(s) 132 may be configured to control system(s) 122, 124, 126 based at least in part on inputs received from an operator via a user interface (not shown), which may include one or more of a steering wheel, a gas pedal, a clutch pedal, a brake pedal, turn signal lever, hazard light switch, and/or the like.

Control system 130 may also include a wireless communication system 160 assists with wireless communication with other systems. For instance, wireless communication system 160 may wirelessly connect control system 130 with one or more other vehicles, buildings, etc. directly or via a communication network. Wireless communication system 160 may include an antenna and a chipset configured to communicate according to one or more wireless communication protocols, such as Bluetooth, communication protocols described in IEEE 802.11, GSM, CDMA, UMTS, EV-DO, WiMAX, LTE, Zigbee, dedicated short range communications (DSRC), radio frequency identification (RFID) communications, etc. It should be appreciated that the internal communication between the computing device(s) 132 and the system(s) 122, 124, 126, 140, 142 within passenger vehicle 100 may be wired and/or wireless. As a particular example, systems within passenger vehicle 100 may be connected and communicate via a CAN bus.

As a hybrid vehicle, passenger vehicle 100 can operate with less emissions than a convention vehicle driven solely by an internal combustion engine. Passenger vehicle 100 can be propelled both by internal combustion engine system 142 as well as electric machine system 140 using electrical accumulator system 126 as an electrical power source. Power flow within passenger vehicle 100 may be selectively switchable between internal combustion engine system 142 and electric machine system 140. For example, the driver of passenger vehicle 100 may choose between internal combustion engine system 142 and electric machine system 140 as the prime mover for passenger vehicle 100 and switch between the two power sources on demand. Increased usage of electric machine system 140 and decreasing usage of internal combustion engine system 142 can advantageously reduce carbon dioxide emissions in passenger vehicle 100. However, drivers frequently miss opportunities to switch from internal combustion engine system 142 to electric machine system 140 and thus contribute to more environmentally friendly operation of passenger vehicle 100. Certain aspects of the present subject matter encourage driving behavior that reduces operation of internal combustion engine system 142 and increases operation of electric machine system 140 in order to contribute to more environmentally friendly operation of passenger vehicle 100.

Figure 4:
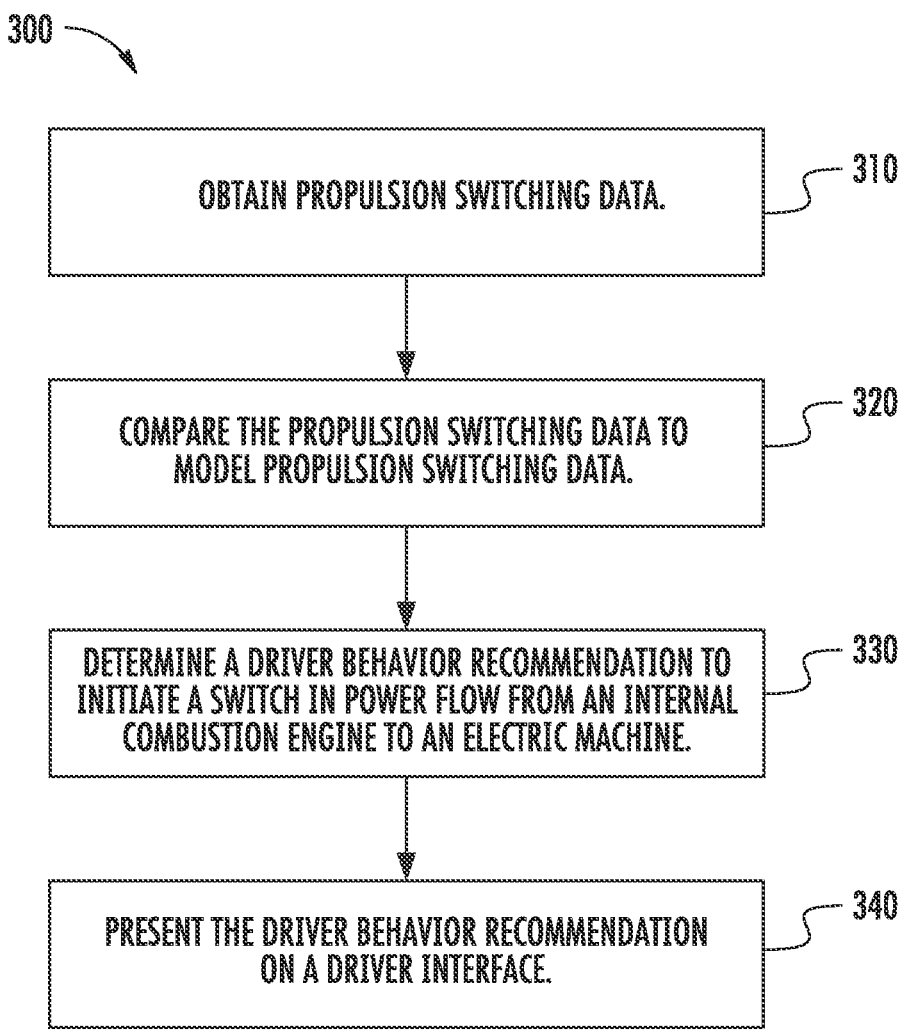
FIG. 4 is a flow diagram of a method for operating a hybrid vehicle according to an example embodiment of the present subject matter.

Referring now to FIG. 4, a flow diagram of a method 300 for operating a hybrid vehicle is illustrated. Method 300 will generally be described with reference to passenger vehicle 100 described with reference to FIGS. 1 and 2, and control system 130 described with reference to FIG. 3. For instance, method 300 may be at least partially executed by computing device(s) 132 of control system 130. However, method 300 may be suitable for use with any other suitable type of vehicle, control system configuration, and/or vehicle system. In addition, although FIG. 4 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 310, method 300 includes obtaining propulsion switching data. The propulsion switching data may be descriptive of a state of one or more vehicle systems for switching power flow of internal combustion engine system 142 and electric machine system 140. As an example, at 310, control system 130 may receive propulsion switching data from various systems of passenger vehicle 100, including internal combustion engine system 142, electric machine system 140, transmission system 124, electrical accumulator system 126, cabin environment system 154, navigation system 156, positioning system 156, etc. via a CAN bus of passenger vehicle 100. Thus, propulsion switching data may be obtained from any system of passenger vehicle 100 that contributes to switching propulsion of passenger vehicle 100 between internal combustion engine system 142 and electric machine system 140. As a particular example, speed and/or temperature sensors within internal combustion engine system 142, electric machine system 140, and/or transmission system 124 may transmit propulsion switching data to control system 130 at 310. As another example, temperature readings and/or charge state signals from electrical accumulator system 126 may be transmitted as propulsion switching data to control system 130 at 310. As more examples, navigation system 156 may transmit a destination for passenger vehicle 100 to control system 130 as propulsion switching data at 310, and positioning system 156 may transmit a current location of passenger vehicle 100 to control system 130 as propulsion switching data at 310. Further, cabin environment system 152 may also transmit a current air conditioning and/or heater operating state to control system 130 as propulsion switching data at 310. The various sensor data and/or operating states of the systems of passenger vehicle 100 may impact the selection of the power source of passenger vehicle 100 between internal combustion engine system 142 and electric machine system 140. Thus, obtaining the propulsion switching data at 310 may assist with switching from internal combustion engine system 142 to electric machine system 140, e.g., in order to reduce emissions and/or efficiently operate passenger vehicle 100, as described in greater detail below.

At 320, method 300 includes comparing the propulsion switching data to model propulsion switching data. The model propulsion switching data may be descriptive of a model state of the one or more vehicle systems when switching power flow from internal combustion engine system 142 to electric machine system 140 is desirable. For instance, the model propulsion switching data may correspond to a conditions when switching power flow from internal combustion engine system 142 to electric machine system 140 reduces emissions and/or more efficiently operates passenger vehicle 100. The model propulsion switching data may be calculated, gathered, or otherwise provided by a manufacturer of passenger vehicle 100 and/or drivetrain system 120. At 320, control system 130 may compare the propulsion switching data to the model propulsion switching data. For example, the model propulsion switching data may be saved within the one or more memories 136 of control system 130, and control system 130 may retrieve the model propulsion switching data from the one or more memories 136 at 320. As another example, the model propulsion switching data may be saved within a remote server, e.g., of the manufacturer of passenger vehicle 100 and/or drivetrain system 120, and control system 130 may retrieve the model propulsion switching data from the remote server via wireless communication system 160.

In certain example embodiments, by comparing the propulsion switching data to the model propulsion switching data at 320, control system 130 may establish whether the actual operating state of passenger vehicle 100 is optimal with respect to emissions and/or efficiency. Thus, e.g., control system 130 may determine that passenger vehicle 100 may be operated more efficiently by switching from internal combustion engine system 142 to electric machine system 140 for propulsion of passenger vehicle 100 based upon the difference between the propulsion switching data from 310 and the model propulsion switching data. In particular, when the propulsion switching data from 310 is different than the model propulsion switching data by less than a threshold, control system 130 may determine that passenger vehicle 100 is operating efficiently with internal combustion engine system 142 for propulsion of passenger vehicle 100. Conversely, control system 130 may determine that passenger vehicle 100 may operate more efficiently by switching from internal combustion engine system 142 to electric machine system 140 for propulsion of passenger vehicle 100 when the propulsion switching data from 310 is different than the model propulsion switching data by more than the threshold.

At 330, method 300 includes determining a driver behavior recommendation to initiate a switch in the power flow from internal combustion engine system 142 to electric machine 140. The driver of passenger vehicle 100 may take various actions to assist with switching from internal combustion engine system 142 to electric machine system 140 for propulsion of passenger vehicle 100. For instance, the driver may decrease a speed of passenger vehicle 100, may adjust cabin environment system 152 to decrease energy consumption of cabin environment system 152, may plug passenger vehicle 100 into a charging station upon arrival at a destination to charge electrical accumulator system 126, may schedule servicing of electrical accumulator system 126, may command switching from internal combustion engine system 142 to electric machine system 140, etc. Control system 130 may determine the driver behavior recommendation in order to increase the usage of electric machine system 140 and decrease the usage of internal combustion engine system 142 when the driver of passenger vehicle 100 implements the driver behavior recommendation.

At 340, method 300 includes presenting the driver behavior recommendation from 330 on a driver interface. For example, control system 130 may present the driver behavior recommendation on information system 150. In particular, the driver behavior recommendation may be presented visually on a display of information system 150, audibly on a speaker of information system 150, and/or in any other suitable manner to inform the driver of passenger vehicle 100 of the driver behavior recommendation via information system 150. As another example, control system 130 may transmit the driver behavior recommendation to a computing device, such as a smartphone or tablet, via wireless communication system 160. For instance, a software application on the computing device of the driver may visually present the driver behavior recommendation on a display of the computing device, audibly present the driver behavior recommendation on a speaker of the computing device, etc.

As noted above, the driver behavior recommendation can encourage the driver of passenger vehicle 100 to take actions which encourage switching from internal combustion engine system 142 to electric machine system 140 for propulsion of passenger vehicle 100. Thus, based at least in part on the driver behavior recommendation from 340, the driver of passenger vehicle 100 may adjust operation of passenger vehicle 100 to increase the usage of electric machine system 140 and decrease the usage of internal combustion engine system 142. For instance, the driver may decrease the speed of passenger vehicle 100, may adjust cabin environment system 152 to decrease energy consumption of cabin environment system 152, may plug passenger vehicle 100 into a charging station, may schedule servicing of electrical accumulator system 126, may command switching from internal combustion engine system 142 to electric machine system 140, etc. in response to receipt of the driver behavior recommendation. In certain example embodiments, the driver behavior recommendation may be automatically implemented by control system 130 unless the driver opts out of the driver behavior recommendation.

It will be understood that while described above in the context of a hybrid vehicle, certain aspects of the present subject matter may be used with conventional internal combustion powered vehicles to reduce emissions and save fuel. For instance, emission data from vehicle systems may be collected via a CAN bus and compared to model data. A driver behavior recommendation for reducing fuel consumption may be developed based upon the difference between the collected data and the model data, and the driver behavior recommendation may be presented to the driver encourage environmentally friendly driving.

Figure 5:
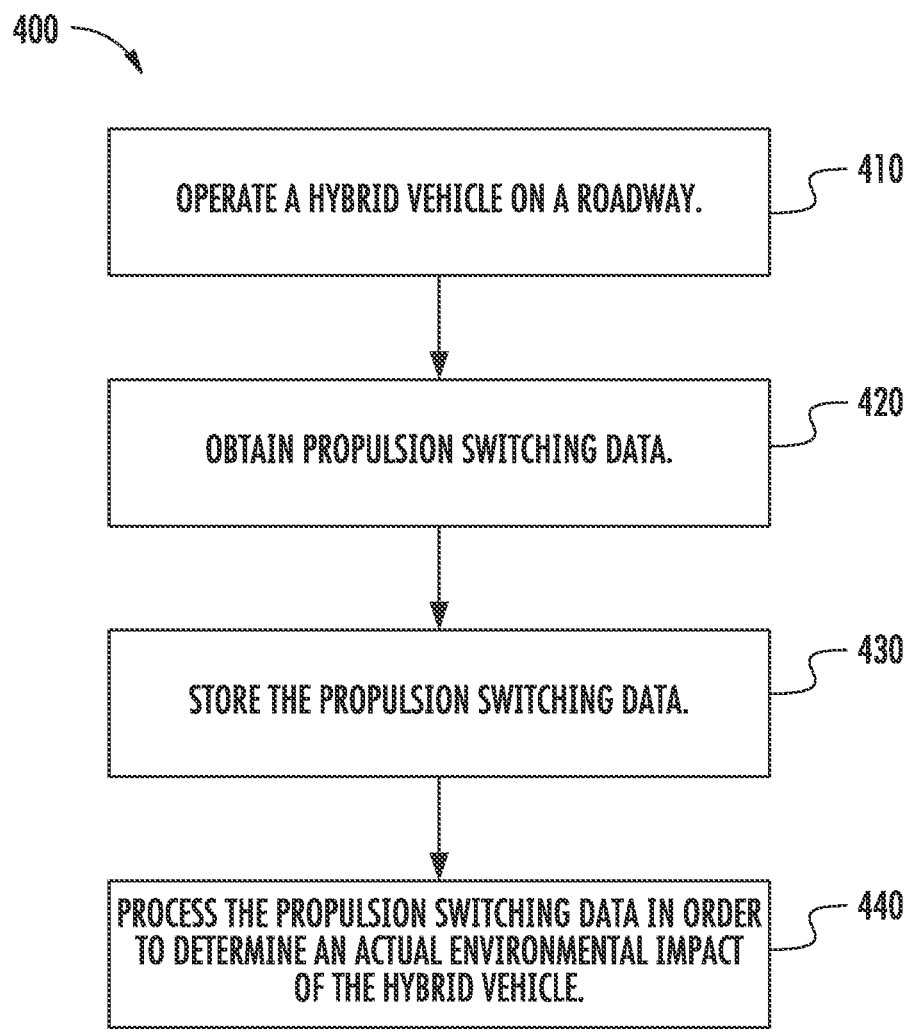
FIG. 5 is a flow diagram of a method for operating a hybrid vehicle according to another example embodiment of the present subject matter.

Referring now to FIG. 5, a flow diagram of a method 400 for operating a hybrid vehicle is illustrated. Method 400 will generally be described with reference to passenger vehicle 100 described with reference to FIGS. 1 and 2, and control system 130 described with reference to FIG. 3. For instance, method 400 may be at least partially executed by computing device(s) 132 of control system 130. However, method 400 may be suitable for use with any other suitable type of vehicle, control system configuration, and/or vehicle system. In addition, although FIG. 5 depict steps performed in a particular order for purposes of illustration and discussion, the methods and algorithms discussed herein are not limited to any particular order or arrangement. One skilled in the art, using the disclosures provided herein, will appreciate that various steps of the methods and algorithms disclosed herein can be omitted, rearranged, combined, and/or adapted in various ways without deviating from the scope of the present disclosure.

At 410, method 400 includes operating passenger vehicle 100 on a roadway. Thus, e.g., a driver may operate passenger vehicle 100 such that internal combustion engine system 142 and/or electric machine system 140 propel passenger vehicle 100 along the roadway. Accordingly, passenger vehicle 100 may be operating to convey the driver, one or more passengers, and/or cargo to a destination at 410. Passenger vehicle 100 may not be undergoing regulatory emissions testing within a controlled setting at 410 but rather may be operated in a normal, day-to-day manner.

At 420, method 400 includes obtaining propulsion switching data while passenger vehicle 100 is travelling on the roadway. The propulsion switching data is descriptive of a state of one or more vehicle systems for switching power flow of internal combustion engine system 142 and electric machine system 140. As an example, at 420, control system 130 may receive propulsion switching data from various systems of passenger vehicle 100, including internal combustion engine system 142, electric machine system 140, transmission system 124, electrical accumulator system 126, navigation system 156, positioning system 156, etc. via a CAN bus of passenger vehicle 100. Thus, propulsion switching data may be obtained from any system of passenger vehicle 100 that contributes to switching propulsion of passenger vehicle 100 between internal combustion engine system 142 and electric machine system 140. At 420, control system 130 may obtain the propulsion switching data over a regulatory operating interval, such as a predetermined distance. Thus, e.g., the period or interval over which propulsion switching data is obtained while passenger vehicle 100 is travelling on the roadway may correspond to a distance or time period defined by regulatory testing requirements, e.g., despite not operating passenger vehicle 100 under testing conditions bur rather in a normal, day-to-day manner.

As a particular example, the propulsion switching data may include a start time of passenger vehicle 100 operating on the roadway at 410, an end time of passenger vehicle operating on the roadway at 410, a speed of passenger vehicle 100 while operating on the roadway at 410, an average speed of passenger vehicle 100 while operating on the roadway at 410, a total operating time of passenger vehicle 100 while operating on the roadway at 410, an interval of uninterrupted operation (e.g., of internal combustion engine system 142 and/or electric machine system 140) while operating on the roadway at 410, and a switch time between internal combustion engine system 142 and the electric machine system 140 while operating on the roadway at 410. The propulsion switching data may also include an average fuel consumption rate while operating on the roadway at 410, a distance travelled by passenger vehicle while operating on the roadway at 410, the operating status of cabin environment system 152 (such as a current air conditioning and/or heater operating state), an exterior temperature about passenger vehicle 100, a charge status of electrical accumulator system 126, etc. Thus, obtaining the propulsion switching data at 420 may assist with obtaining actual emissions and/or efficiency data for passenger vehicle 100.

At 430, method 400 includes storing the propulsion switching data. For example, the propulsion switching data may be saved within the one or more memories 136 of control system 130, and control system 130 may store the propulsion switching data within the one or more memories 136 at 430. As another example, the propulsion switching data may be saved within a remote server, e.g., of a manufacturer of passenger vehicle 100 and/or drivetrain system 120, and control system 130 may transmit the propulsion switching data to the remote server via wireless communication system 160.

At 440, method 400 includes processing the propulsion switching data in order to determine an actual environmental impact of passenger vehicle 100 while passenger vehicle 100 operated on the roadway at 410. The actual environmental impact of passenger vehicle 100 from 440 may be used to assist manufacturer compliance with emission regulations, such as annual fleet average fuel economy and emission regulations. When the actual emission and efficiency performance of passenger vehicle 100 exceeds the tested performance of passenger vehicle 100, the actual environmental impact of passenger vehicle 100 from 440 may be used to evidence regulation compliance and/or for emissions credits. Moreover, a decrease in carbon dioxide emissions may be shown with the actual environmental impact of a fleet of passenger vehicles 100. For example, the manufacturer of passenger vehicle 100 may appeal the tested emissions with actual emissions testing conducted via method 400. Thus, method 400 may be implemented across fleet of vehicles to gather data for such fleet. Accordingly, the actual environmental impact for a plurality of vehicles may be accumulated using method 400 for each vehicle of the plurality of vehicles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

100 Passenger vehicle
110 Body
112 Interior cabin
114 Doors
116 Wheels
120 Drivetrain system
122 Motor system
124 Transmission system
126 Electrical accumulator/storage system
128 Torque converter
129 Differential
130 Control system
132 Computing devices
134 Processors
136 Memories
138 Instructions
139 Data
140 Electric machine system
142 Internal combustion engine system
150 Information system
152 Cabin environment system
154 Navigation system 156 Positioning system
160 Wireless communications system
300 Method
400 Method

What is claimed is:

1. A computer-implemented method for operating a hybrid vehicle, comprising:
   obtaining, with a computing system of the hybrid vehicle that comprises one or more computing devices, propulsion switching data descriptive of a state of one or more vehicle systems for switching power flow of an internal combustion engine and an electric machine;
   comparing, with the computing system, the propulsion switching data to model propulsion switching data for the one or more vehicle systems;
   when the propulsion switching data is different than the model propulsion switching data, determining, by the computing system, a driver behavior recommendation to initiate a switch in the power flow from the internal combustion engine to the electric machine; and
   presenting the driver behavior recommendation on a driver interface,
   wherein the driver behavior recommendation comprises instructions for a driver of the vehicle to adjust operation of the hybrid vehicle to initiate the switch in the power flow from the internal combustion engine to the electric machine.

2. The method of claim 1, wherein obtaining the propulsion switching data comprises obtaining the propulsion switching data with the computing system from the one or more vehicle systems via a CAN bus.

3. The method of claim 1, wherein the model propulsion switching data is stored within a memory of the computing system.

4. The method of claim 1, wherein the model propulsion switching data is stored within a remote server, the method further comprising wirelessly transmitting the model propulsion switching data from the remote server to the computing system.

5. The method of claim 1, wherein the model propulsion switching data is provided by a manufacturer of the hybrid vehicle.

6. The method of claim 1, wherein determining the driver behavior recommendation comprises determining, by the computing system, the driver behavior recommendation to reduce operation of the internal combustion engine.

7. The method of claim 1, wherein the driver interface comprises one or both of an infotainment monitor and a speaker within the hybrid vehicle.

8. The method of claim 1, wherein the driver interface comprises a software application on a driver computing device.

9. The method of claim 1, wherein the propulsion switching data comprises one or more of a battery charge state, a location of the hybrid vehicle, a destination of the hybrid vehicle, and an operating state of an air conditioning system.

10. The method of claim 1, wherein the driver behavior recommendation comprises one or more of plugging in and charging a battery upon arrival at a destination, scheduling servicing of the battery, adjusting a speed of the hybrid vehicle, adjusting an operating state of an air conditioning system, and switching the power flow from the internal combustion engine to the electric machine.

11. A method for operating a hybrid vehicle, comprising:
   operating the hybrid vehicle on a roadway;
   while the hybrid vehicle is operating on the roadway, obtaining propulsion switching data descriptive of a state of one or more vehicle systems for switching power flow of an internal combustion engine and an electric machine; and
   storing the propulsion switching data in a memory; and
   processing the propulsion switching data in order to determine an actual environmental impact of the hybrid vehicle while the hybrid vehicle operated on the roadway,
   wherein the actual environmental impact of the hybrid vehicle comprises one or both of an actual fuel economy and an actual carbon dioxide emission while the hybrid vehicle is operating on the roadway.

12. The method of claim 11, wherein obtaining the propulsion switching data comprises obtaining the propulsion switching data over a regulatory operating interval.

13. The method of claim 12, wherein the regulatory operating interval comprises a predetermined distance.

14. The method of claim 11, wherein obtaining the propulsion switching data comprises obtaining the propulsion switching data with a computing system of the hybrid vehicle that comprises one or more computing devices via a CAN bus.

15. The method of claim 11, wherein the propulsion switching data is stored within a memory on the hybrid vehicle.

16. The method of claim 11, wherein the propulsion switching data is stored within a remote server, the method further comprising wirelessly transmitting the propulsion switching data from the hybrid vehicle to the remote server.

17. The method of claim 11, wherein the propulsion switching data comprises one or more of a start time of the hybrid vehicle operating on the roadway, a total operating time of the hybrid vehicle operating on the roadway, an interval of uninterrupted operation while the hybrid vehicle is operating on the roadway, and a switch time between the internal combustion engine and the electric machine.

18. The method of claim 11, further comprising:
   performing the steps of operating, obtaining propulsion switching data, storing the propulsion switching data in a memory, and processing the propulsion switching data for a plurality of additional hybrid vehicles; and
   based at least in part on the actual environmental impact of the hybrid vehicle and an actual environmental impact of the additional hybrid vehicles, computing an actual environmental impact for a fleet of hybrid vehicles that includes the hybrid vehicle and the plurality of additional hybrid vehicles.

* * * * *